Figure 1:
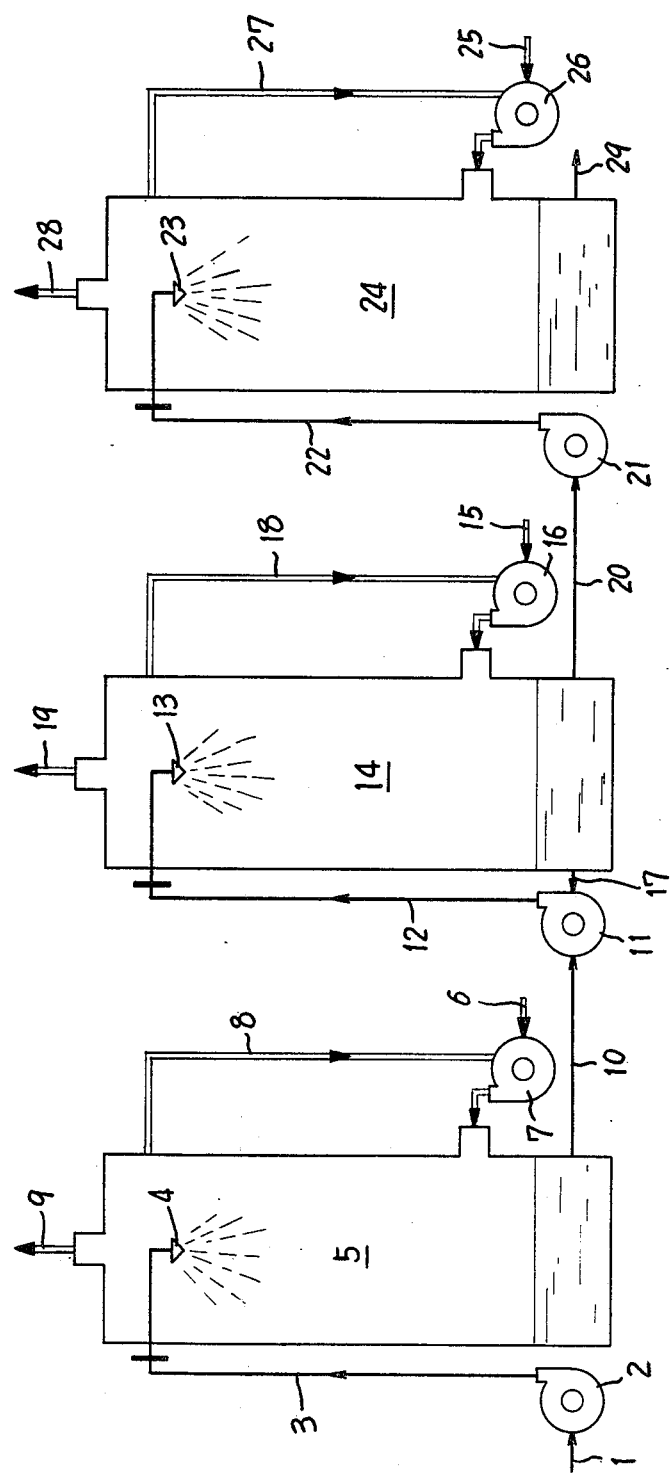

United States Patent [19]

Shibazaki et al.

[11] 4,133,894
[45] Jan. 9, 1979

[54] PROCESS FOR PREPARING PRECIPITATED CALCIUM CARBONATE

[75] Inventors: Hiroji Shibazaki, Takarazuka; Setsuji Edagawa, Nishinomiya; Hisashi Hasegawa, Nishinomiya; Satoshi Kondo, Nishinomiya, all of Japan

[73] Assignee: Shiraishi Kogyo Kaisha, Ltd., Amagasaki, Japan

[21] Appl. No.: 832,902

[22] Filed: Sep. 13, 1977

[30] Foreign Application Priority Data

Sep. 25, 1976 [JP] Japan .................................. 51-115236

[51] Int. Cl.$^2$ ............................................. C01F 11/18
[52] U.S. Cl. .................................................. 423/432
[58] Field of Search ............... 423/432, 430, 165, 158, 423/224, 230; 106/306

[56] References Cited

U.S. PATENT DOCUMENTS

| | | | |
|---|---|---|---|
| 1,188,505 | 6/1916 | Statham | 423/165 |
| 1,372,193 | 3/1921 | Roon | 423/432 |
| 2,081,112 | 5/1937 | Statham et al. | 423/432 |
| 3,443,890 | 5/1969 | Sisson et al. | 423/432 |

FOREIGN PATENT DOCUMENTS 562544  7/1944  United Kingdom ..................... 423/432

Primary Examiner—O. R. Vertiz
Assistant Examiner—Thomas W. Roy
Attorney, Agent, or Firm—Bierman & Bierman

[57] ABSTRACT

Precipitated calcium carbonate of uniform particle size is produced by contacting a suspension of calcium hydroxide with a carbon dioxide-containing gas in three steps. The particle size of precipitated calcium carbonate can be optionally selected by suitably adjusting reaction conditions.

4 Claims, 1 Drawing Figure

PROCESS FOR PREPARING PRECIPITATED CALCIUM CARBONATE

This invention relates to a novel process for preparing precipitated calcium carbonate.

The carbonation process has heretofore been practiced on a commercial scale for the production of precipitated calcium carbonate. According to this process, carbon dioxide is blown into a suspension of calcium hydroxide, and the resulting calcium carbonate is intermittently recovered. However, since the operation is carried out batchwise, the process has the drawbacks of being inefficient and giving particles of widely varying sizes. Despite various attempts so far made to overcome these drawbacks, satisfactory results still remain to be achieved.

The inventors have found that precipitated calcium carbonate of uniform particle size can be continuously produced by repeating the step of carbonation reaction in which a suspension of calcium hydroxide is sprayed in the form of droplets of specified diameter into a carbon dioxide-containing gas having a specified superficial velocity in a column. The inventors have further found that fine particles of precipitated calcium carbonate can be produced in an optionally selected average size of about 0.02 to about 3$\mu$m by the multi-step reaction process when the droplet diameter, solids concentration and temperature of the calcium hydroxide suspension, the superficial velocity of the carbon dioxide-containing gas, etc. are suitably adjusted. This invention has been accomplished based on these novel findings.

This invention includes a process especially suited for the production of superfine particles of calcium carbonate less than about 0.1$\mu$m in average particles size (to be hereinafter referred to simply as "the first process") and another process especially suited for producing fine particles of calcium carbonate about 0.1 to about 3.0$\mu$m in average particle size (to be hereinafter referred to briefly as "the second process"). The first process and the second process, which differ from each other in the particle size of the resulting product, invariably differ from each other in the reaction conditions involved. Accordingly, the first process and the second process will be described below individually with respect to the reaction conditions.

In the first step of the first process, there is the necessity of uniformly producing a suitable amount of nuclei of calcium carbonate crystals in the form of a thread-like gel or a chain-like gel so that the final third step of the process will give superfine calcium carbonate particles involving reduced variations in particle size and up to about 0.1$\mu$m in average particle size. For this purpose, a suspension of calcium hydroxide having a solids concentration of up to 10 wt.% for example 0.1 to 10 wt.%, and a temperature of up to 30° C. for example 1 to 30° C., is sprayed in the form of droplets about 0.2 to about 1.0 mm in diameter against a gas containing 10 to 40 vol.% of carbon dioxide in countercurrent contact therewith while the gas is being passed upward through a column at a superficial velocity of about 0.02 to about 0.5 m/sec, whereby 5 to 15% of the calcium hydroxide is converted to calcium carbonate. If the solids concentration exceeds 10 wt.% or the temperature of the suspension is higher than 30° C., a vigorous and nonuniform reaction takes place, giving crystal nuclei which are uneven in shape and size, with the resulting tendency that the calcium carbonate particles finally obtained are similarly uneven in shape and size. When the diameter of the droplets of the suspension is greater than about 1.0 mm, the reaction proceeds unevenly, whereas if it is smaller than about 0.2 mm, the droplets will be run off from the reaction column as entrained in the carbon dioxide-containing gas. With less than 10 vol.% of carbon dioxide present, the reaction fails to proceed satisfactorily, whereas the use of over 40 vol.% of carbon dioxide does not noticeably favor the reaction and is therefore economically disadvantageous. When the carbon dioxide-containing gas is passed at a superficial velocity of less than about 0.02 m/sec, the reaction will not fully proceed, while if the velocity is higher than about 0.5 m/sec, the droplets of the calcium hydroxide suspension tend to flow out from the column along with the gas. The temperature of the carbon dioxide gas, although not particularly limited, is preferably about 20 to about 40° C. in view of economy, etc. In the first step of the first process, it is preferable that a suspension of calcium hydroxide having a solids concentration of 4 to 7 wt.% and a temperature of 10 to 25° C. be sprayed in the form of droplets about 0.5 to about 1.0 mm in diameter against a gas containing 20 to 35 vol.% of carbon dioxide and passed upward through the column at a superficial velocity of about 0.02 to about 0.20 m/sec.

In the second step of the first process, carbon dioxide is reacted with the suspension resulting from the first step and containing nuclei of calcium carbonate crystals in the form of a thread-like gel or a chain-like gel for the growth of the crystals. At a temperature of up to 30° C., the suspension from the first step is sprayed in the form of droplets of about 1.0 to about 2.0 mm in diameter into a column in countercurrent contact with a gas containing 10 to 40 vol.% of carbon dioxide while the gas is being passed upward through the column at a superficial velocity of about 1.0 to about 3.0 m/sec. This achieves 95 to 98% carbonation. The suspension subjected to the second step, although having the same temperature as in the first step, is sprayed as droplets of increased diameter against the carbon dioxide-containing gas which is fed at a correspondingly increased superficial velocity, since the suspension contains crystal nuclei. Preferably, the suspension to be subjected to the second step of the first process has a solids concentration of 5 to 10 wt.% and a temperature of 15 to 30° C. and is sprayed in the form of droplets about 1.0 to about 1.5 mm in diameter against a gas containing 15 to 35 vol.% of carbon dioxide and passed upward through the column at a superficial velocity of about 1.5 to about 2.5 m/sec.

In the third step of the first process, the suspension from the second step is further reacted with carbon dioxide to complete the growth of the crystals. Thus, the suspension from the second step is sprayed at a temperature of up to 30° C. and in the form of droplets of about 1.5 to about 2.0 mm in diameter into a column in countercurrent contact with a gas containing 10 to 40 vol.% of carbon dioxide while the gas is being passed upward through the column at a superficial velocity of about 1.5 to about 3.0 m/sec, whereby the carbonation reaction is completed, affording superfine particles of precipitated calcium carbonate less than about 0.1$\mu$m in size. Although the suspension is subjected to the reaction of the third step at the same temperature as in the first step, the droplets thereof are of increased diameter if minimum, with the minimum superficial velocity of the carbon dioxide-containing gas also correspondingly increased, because the suspension contains fairly grown crystals. Preferably, the suspension to be subjected to the third step has a solids concentration of 5 to 10 wt.% and a temperature of 25 to 30° C. and is sprayed as droplets about 1.5 to about 2.0 mm in diameter against a gas containing 20 to 35 vol.% of carbon dioxide and passed upward through the column at a superficial velocity of about 1.5 to about 3.0 m/sec. The calcium carbonate formed can be separated with ease in a usual manner, for example with the use of a filter press or vacuum filter.

The superfine particles of precipitated calcium carbonate less than about 0.1μm in average size and obtained by the first process involve greatly reduced variations in size. Such a unique product, which can not be produced by the conventional carbonation process, is very useful as a filler for reinforcing rubber, plastics, etc.

The second process intended to continuously produce particles of precipitated calcium carbonate about 0.1 to about 3.0μm in average size. To uniformly produce a suitable amount of nuclei of calcium carbonate crystals in the form of bundled threads in the first step, a suspension of calcium hydroxide having a solids concentration of 10 to 15 wt.% and a temperature of 30 to 80° C. is sprayed in the form of droplets about 0.2 to about 1.0 mm in diameter against a gas containing 10 to 40 vol.% of carbon dioxide in countercurrent contact therewith while the gas is being passed upward through a column at a superficial velocity of about 0.02 to about 0.5 m/sec, whereby 5 to 15% of the calcium hydroxide is converted to calcium carbonate. If the solids concentration is less than 10 wt.% or the temperature of the suspension is lower than 30° C., the particles of calcium carbonate finally obtained will be less than about 0.1μm in size. If the solids concentration exceeds 15 wt.%, it becomes difficult to uniformly spray the suspension in the form of droplets, reducing the uniformity of the particle distribution of the final product. Further when the temperature of the suspension is higher than 80° C., the crystal nuclei formed will be uneven in shape and size, with the result that the final product will contain particles greater than about 3μm. When the diameter of the droplets of the suspension is greater than about 1.0 mm, the reaction proceeds unevenly, whereas if it is smaller than about 0.2 mm, the droplets will be run off from the reaction column as entrained in the carbon dioxide-containing gas. With less than 10 vol.% of carbon dioxide present, the reaction fails to proceed satisfactorily, whereas the use of over 40 vol.% of carbon dioxide does not noticeably favor the reaction and is therefore economically disadvantageous. When the carbon dioxide-containing gas is passed at a superficial velocity of less than about 0.02 m/sec, the reaction will not fully proceed, while if the velocity is higher than about 0.5 m/sec, the droplets of the calcium hydroxide suspension tend to flow out from the column along with the gas. In the first step of the second process, it is preferable that a suspension of calcium hydroxide having a solids concentration of 10 to 15 wt.% and a temperature of 40 to 80° C. be sprayed in the form of droplets about 0.5 to about 1.0 mm in diameter against a gas containing 15 to 35 vol.% of carbon dioxide and passed upward through the column at a superficial velocity of about 0.02 to about 0.1 m/sec.

In the second step of the second process, carbon dioxide is reacted with the suspension resulting from the first step and containing nuclei of calcium carbonate crystals in the form of bundled threads for the growth of the crystals. At a temperature of 30 to 80° C., the suspension from the first step is sprayed in the form of droplets of about 1.0 to about 2.0 mm in diameter into a column in countercurrent contact with a gas containing 10 to 40 vol.% of carbon dioxide while the gas is being passed upward through the column at a superficial velocity of about 0.02 to about 1.0 m/sec. This achieves 95 to 98% carbonation. Although the suspension is subjected to the second step at the same temperature as in the first step, the droplets thereof are of increased diameter if minimum, and the minimum superficial velocity of the carbon dioxide-containing gas is also correspondingly increased for the growth of the crystals. Preferably, the suspension to be subjected to the second step of the second process has a solids concentration of 13 to 20 wt.% and a temperature of 45 to 80° C. and is sprayed as droplets of about 1.5 to about 2.0 mm in diameter against a gas containing 15 to 35 vol.% of carbon dioxide and passed upward through the column at a superficial velocity of about 0.05 to about 1.0 m/sec.

In the third step of the second process, the suspension from the second step is further reacted with carbon dioxide to grow the calcium carbonate crystals to an average size of about 1.0 to about 3.0μm. Thus, the suspension from the second step is sprayed at a temperature of 30 to 80° C. and in the form of droplets of about 1.5 to about 2.0 mm in diameter into a column in countercurrent contact with a gas containing 10 to 40 vol.% of carbon dioxide while the gas is being passed upward through the column at a superficial velocity of about 1.5 to about 3.0 mm/sec. Although the suspension is subjected to the third step at the same temperature as in the first step, the droplets thereof are of increased diameter if minimum, with the minimum superficial velocity of the carbon dioxide-containing gas also correspondingly increased since the suspension contains fairly grown crystals. Preferably, the suspension to be subjected to the third step has a solids concentration of 13 to 20 wt.% and a temperature of 50 to 80° C. and is sprayed as droplets of about 1.5 to about 2.0 mm in diameter against a gas containing 15 to 35 vol.% of carbon dioxide and passed upward through the column at a superficial velocity of about 1.5 to about 3.0 m/sec. The calcium carbonate formed can be separated with ease in a usual manner, for example with the use of a filter press or vacuum filter.

The fine particles of precipitated calcium carbonate obtained by the second process are of uniform size, about 1.0 to about 3.0μm on the average. The product is therefore very useful as a filler, extender pigment, etc. for industrial products such as rubber, plastics, paper, coating compositions, printing inks and the like.

A mode of practicing this invention will be described below with reference to the flow chart of FIG. 1.

A suspension of calcium hydroxide is fed through a line 1, a pump 2 and a line 3 and sprayed from a nozzle 4 into a column 5 for the first-step reaction. By way of a line 6 and a blower 7, a carbon dioxide-containing gas is fed to the column 5 upward from its lower portion to effect the first-step reaction. When the gas used for the reaction still contains carbon dioxide in a sufficiently high concentration, the gas can be circulated to the column 5 from its upper portion via a line 8. After the reaction, the carbon dioxide-containing gas is suitably run off from the column 5 from its top via a line 9. The feed rate of the carbon dioxide-containing gas from the line 6, the concentration of the carbon dioxide, the rate of circulation of the gas through the line 8, the rate and timing of discharge of the gas from the line 9 are determined in accordance with the concentration and temperature of the calcium hydroxide suspension, the degree of progress of the reaction, etc.

The suspension resulting from the first-step reaction is passed through a line 10, a pump 11 and a line 12 and sprayed from a nozzle 13 into a column 14 for the second-step reaction. Through a line 15 and a blower 16, a carbon dioxide-containing gas is fed to the column 14 upward from its lower portion for the second-step reaction. Since the carbonation reaction must be effected to 95 to 98% in the column 14, the suspension remaining in the bottom of the column may be repeatedly sprayed from the nozzle 13 via a line 17, the pump 11 and the line 12 when so desired. The carbon dioxide-containing gas is circulated through a line 18 and discharged from a line 19 in the same manner as in the first-step reaction.

The suspension resulting from the second-step reaction is further passed through a line 20, a pump 21 and a line 22 and sprayed from a nozzle 23 into a column 24 for the third-step reaction against a carbon dioxide-containing gas fed to the column 24 from its lower portion via a line 25 and a blower 26 and flowing upward through the column, whereby the final third-step reaction is conducted. The carbon dioxide-containing gas is circulated through a line 27 and discharged through a line 28 in the same manner as in the first-step reaction. The resulting suspension containing calcium carbonate particles of the desired size is drawn off via a line 29. The calcium carbonate is separated from the suspension in a usual manner as by a filter press or vacuum filter and recovered as solids.

Since carbon dioxide can be absorbed by calcium hydroxide efficiently with uniform progress of the carbonation reaction according to this invention, it has become possible for the first time to commercially efficiently produce fine particles of calcium carbonate in desired sizes free of variations.

EXAMPLE 1

In the first step, a suspension of calcium hydroxide having a solids concentration of 6.0 wt.% and a temperature of 15° C. is sprayed in the form of droplets about 0.5 mm in diameter and at a rate of 3000 kg/hr against a gas containing 30 vol.% of carbon dioxide, having a temperature of 30° C. and fed at rate of 30 $m^3$/hr (superficial velocity 0.1 m/sec) to effect a uniform reaction. At a carbonation degree of 12%, crystal nuclei in the form of thread or chain-like gels were obtained.

In the second step, the suspension resulting from the first step is sprayed in the form of droplets about 1.2 mm in diameter against a gas containing 30 vol.% of carbon dioxide, having a temperature of 30° C. and fed at a rate of 230 $m^3$/hr (superficial velocity of 2.0 m/sec) for a rapid and uniform reaction to effect the carbonation to 98%, whereby dispersed fine particles are formed.

In the third step, the suspension from the second step is sprayed in the form of droplets about 1.5 mm in diameter against a gas containing 30 vol.% of carbon dioxide and having a temperature of 30° C. and fed at a rate of 10 $m^3$/hr (superficial velocity of 2.5 m/sec) for a rapid and uniform reaction, whereby the carbonation is completed. At a rate of 240 kg/hr, the reaction yields precipitated calcium carbonate in the form of dispersed particles about 0.03 $\mu$m in average size.

EXAMPLE 2

In the first step, a suspension of calcium hydroxide having a solids concentration of 6.5 wt.% and a temperature of 25° C. is sprayed in the form of droplets about 0.7 mm in diameter and at a rate of 3000 kg/hr against a gas containing 30 vol.% of carbon dioxide, having a temperature of 30° C. and fed at a rate of 40 $m^3$/hr (superficial velocity 0.2 m/sec) to effect carbonation to 15% by a uniform reaction.

In the second step, the suspension resulting from the first step is sprayed in the form of droplets about 1.5 mm in diameter against a gas containing 30 vol.% of carbon dioxide, having a temperature of 30° C. and fed at a rate of 230 $m^3$/hr (superficial velocity of 2.5 m/sec) for a rapid and uniform reaction to effect the carbonation to 98%, whereby dispersed fine particles are formed.

In the third step, the suspension from the second step is sprayed in the form of droplets about 2.5 mm in diameter against a gas containing 30 vol.% of carbon dioxide and having a temperature of 30° C. and fed at a rate of 20 $m^3$/hr (superficial velocity of 3.5 m/sec) for a rapid and uniform reaction, whereby the carbonation is completed. At a rate of 260 kg/hr, the reaction yields precipitated calcium carbonate in the form of particles about 0.08 $\mu$m in average size.

EXAMPLE 3

In the first step, a suspension of calcium hydroxide having a solids concentration of 10 wt.% and a temperature of 60° C. is sprayed in the form of droplets about 1.0 mm in diameter and at a rate of 2000 kg/hr against a gas containing 20 vol.% of carbon dioxide, having a temperature of 30° C. and fed at a rate of 45 $m^3$/hr (superficial velocity 0.05 m/sec) to effect a mild reaction and to thereby continuously form crystal nuclei in the form of bundled threads at a carbonation degree of 10%.

In the second step, the suspension resulting from the first step is sprayed in the form of droplets about 1.6 mm in diameter against a gas containing 20 vol.% of carbon dioxide, having a temperature of 30° C. and fed at a rate of 380 $m^3$/hr (superficial velocity of 0.1 m/sec) and is reacted repeatedly with the gas to effect the carbonation to 95%, whereby dispersed fine particles 0.8 $\mu$m in average size are formed.

In the third step, the suspension from the second step is sprayed in the form of droplets about 1.6 mm in diameter against a gas containing 20 vol.% of carbon dioxide and having a temperature of 30° C. and fed at a rate of 25 $m^3$/hr (superficial velocity of 2.5 m/sec) for a rapid and uniform reaction, whereby the carbonation is completed. At a rate of 270 kg/hr, the reaction yields precipitated calcium carbonate in the form of particles about 1.0 $\mu$m in average size.

EXAMPLE 4

In the first step, a suspension of calcium hydroxide having a solids concentration of 15 wt.% and a temperature of 80° C. is sprayed in the form of droplets 1.0 mm in diameter and at a rate of 3000 kg/hr against a gas containing 30 vol.% of carbon dioxide, having a temperature of 30° C. and fed at a rate of 90 $m^3$/hr (superficial velocity of 0.02 m/sec) to achieve a carbonation degree of 15% by a uniform reaction.

In the second step, the suspension resulting from the first step is sprayed in the form of droplets 2.0 mm in diameter against a gas containing 30 vol.% of carbon dioxide, having a temperature of 30° C. and fed at a rate of 500 m³/hr (superficial velocity of 1.0 m/sec) for a rapid and uniform reaction to effect the carbonation to 98%.

In the third step, the suspension from the second step is sprayed in the form of droplets 2.0 mm in diameter against a gas containing 30 vol.% of carbon dioxide and having a temperature of 30° C. and fed at a rate of 20 m³/hr (superficial velocity of 3.0 m/sec) for a rapid and uniform reaction, whereby the carbonation is completed. At a rate of 240 kg/hr, the reaction yields precipitated calcium carbonate in the form of particles 3.0μm in average size.

What we claim is:

1. In the production of precipitated calcium carbonate by contacting a suspension of calcium hydroxide with carbon dioxide, a process for continuously producing precipitated calcium carbonate less than about 0.1μm in particle size which comprises:
    (a) the first step of spraying a suspension of calcium hydroxide having a solids concentration of 0.1 to 10 wt.% and a temperature of 1 to 30° C. in the form of droplets about 0.2 to about 1.0 mm in diameter against a gas containing 10 to 40 vol.% of carbon dioxide in countercurrent contact therewith while the gas is being passed upward through a column at a superficial velocity of about 0.02 to about 0.5 m/sec to effect carbonation to 5 to 15%,
    (b) the second step of spraying the suspension from the first step having a temperature of 1 to 30° C. in the form of droplets about 1.0 to about 2.0 mm in diameter against a gas containing 10 to 40 vol.% of carbon dioxide in countercurrent contact therewith while the gas is being passed upward through a column at a superficial velocity of about 1.0 to about 3.0 m/sec to effect the carbonation to 95 to 98%, and
    (c) the third step of spraying the suspension from the second step having a temperature of 1 to 30° C. in the form of droplets about 1.5 to about 2.0 mm in diameter against a gas containing 10 to 40 vol.% of carbon dioxide in countercurrent contact therewith while the gas is being passed upward through a column at a superficial velocity of about 1.5 to about 3.0 m/sec to complete the carbonation.

2. The process according to claim 1 which comprises:
    (a) the first step of spraying a suspension of calcium hydroxide having a solids concentration of 4 to 7 wt.% and a temperature of 10 to 25° C. in the form of droplets about 0.5 to about 1.0 mm in diameter against a gas containing 20 to 35 vol.% of carbon dioxide and passing upward through the column at a superficial velocity of about 0.02 to about 0.20 m/sec,
    (b) the second step of spraying the suspension from the first step having a solids concentration of 5 to 10 wt.% nd a temperature of 15 to 30° C. in the form of droplets about 1.0 to about 1.5 mm in diameter against a gas containing 15 to 35 vol.% of carbon dioxide and passing upward through the column at a superficial velocity of about 1.5 to about 2.5 m/sec, and
    (c) the third step of spraying the suspension from the second step having a solids concentration of 5 to 10 wt.% and a temperature of 25 to 30° C. in the form of droplets about 1.5 to about 2.0 mm in diameter against a gas containing 20 to 35 vol.% of carbon dioxide and passing upward through the column at a superficial velocity of about 1.5 to about 3.0 m/sec.

3. In the production of precipitated calcium carbonate by contacting a suspension of calcium hydroxide with carbon dioxide, a process for continuously producing precipitated calcium carbonate about 0.1 to about 3.0μm in particle size which comprises:
    (a) the first step of spraying a suspension of calcium hydroxide having a solids concentration of 10 to 15 wt.% and a temperature of 30 to 80° C. in the form of droplets about 0.2 to 1.0 mm in diameter against a gas containing 10 to 40 vol.% of carbon dioxide in countercurrent contact therewith while the gas is being passed upward through a column at a superficial velocity of 0.02 to 0.5 m/sec to effect carbonation to 5 to 15%,
    (b) the second step of spraying the suspension from the first step having a temperature of 30 to 80° C. in the form of droplets about 1.0 to about 2.0 mm in diameter against a gas containing 10 to 40 vol.% of carbon dioxide in countercurrent contact therewith while the gas is being passed upward through a column at superficial velocity of about 0.02 to about 1.0 m/sec to effect the carbonation to 95 to 98%, and
    (c) the third step of spraying the suspension from the second step having a temperature of 30 to 80° C. in the form of droplets about 1.5 to about 2.0 mm in diameter against a gas containing 10 to 40 vol.% of carbon dioxide in countercurrent contact therewith while the gas is being passed upward through a column at a superficial velocity of about 1.5 to about 3.0 m/sec to complete the carbonation.

4. The process according to claim 3 which comprises:
    (a) the first step of spraying a suspension of calcium hydroxide having a solids concentration of 10 to 15 wt.% and a temperature of 40 to 80° C. in the form of droplets about 0.5 to about 1.0 mm in diameter against a gas containing 15 to 35 vol.% of carbon dioxide and passing upward through the column at a superficial velocity of about 0.02 to about 0.1 m/sec,
    (b) the second step of spraying the suspension from the first step having a solids concentration of 13 to 20 wt.% and a temperature of 45 to 80° C. in the form of droplets about 1.5 to 2.0 mm in diameter against a gas containing 15 to 35 vol.% of carbon dioxide and passing upward through the column at a superficial velocity of about 0.05 to 1.0 m/sec, and
    (c) the third step of spraying the suspension from the second step having a solids concentration of 13 to 20 wt.% and a temperature of 50 to 80° C. in the form of droplets about 1.5 to 2.0 mm in diameter against a gas containing 15 to 35 vol.% of carbon dioxide and passing upward through the column at a superficial velocity of about 1.5 to about 3.0 m/sec.

* * * * *